Jan. 31, 1956
H. CONTE
2,732,562
WATER CLOSET FLUSH TANKS
Filed Dec. 24, 1952
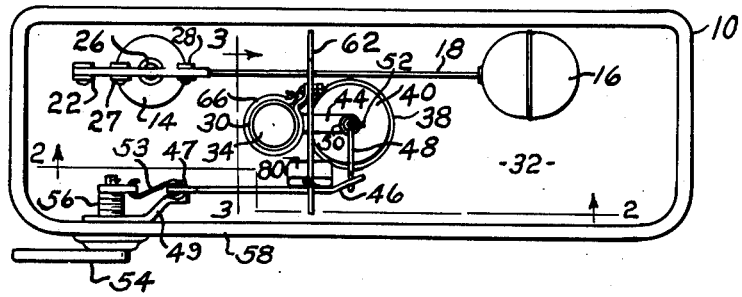
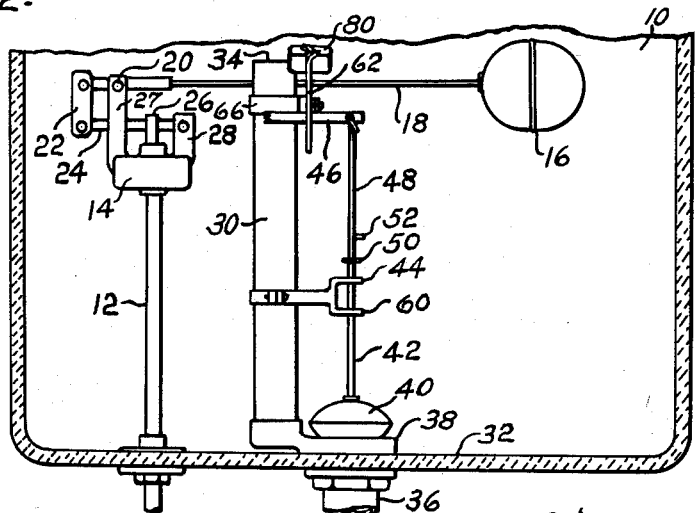
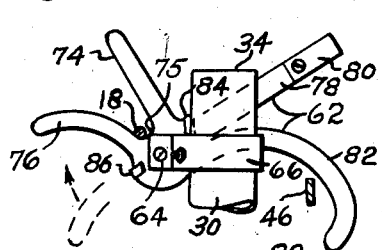
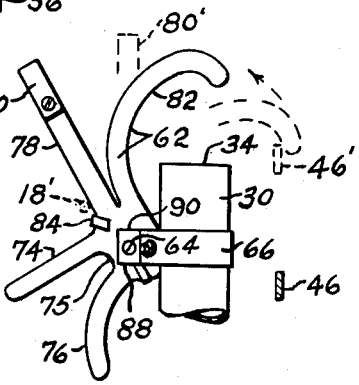
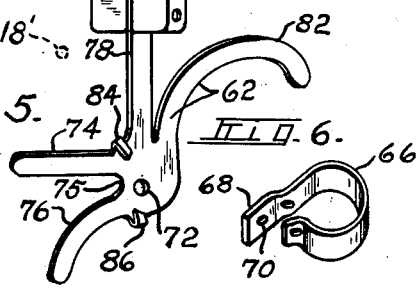
INVENTOR
HENRY CONTE
BY F. P. Keiper
ATTORNEY United States Patent Office 2,732,562
Patented Jan. 31, 1956

2,732,562
WATER CLOSET FLUSH TANKS
Henry Conte, Rochester, N. Y.

Application December 24, 1952, Serial No. 327,737

16 Claims. (Cl. 4—41)

This invention relates to water closet flush tanks, and more particularly to mechanism providing for more positive valve action, as well as for indicating the presence of defective valves and preventing water waste.

In water closet flush tanks, there is generally provided a water inlet valve having a float control, a flush valve, and an overflow pipe. If either valve is defective, water continually flows through the tank, creating wastage, usually without the knowledge of the owner or tenant. In municipalities where water meters are not required, the owner or tenant gives little or no thought to the steady drain on the municipal water system. Where meters are employed, the owner or tenant pays an abnormal water charge, usually without suspecting the cause.

The present invention is directed to an appliance universally applicable to most standard flush tanks, which will be effective to urge the inlet valve positively to a closed position, against any sticking or other tendency to remain slightly open to prevent water wastage by continous overflow. The invention further is directed to preventing continuous flow of water through the tank should the flush valve be defective.

An object of the invention is to provide means for causing the inlet valve to be closed by a sudden movement rather than gradual, whereby to overcome any sticking tendency to prevent complete closure.

A further object of the invention is to provide a control for the float valve effective to restrict float valve operation following tank flushing to a single filling movement, such float valve terminating and remaining at a closed inlet valve position until manually actuated in anticipation of a succeeding flushing operation.

A further object of the invention is to provide a control for the float valve effective to permit only normal operation thereof in response to each flushing cycle.

Still a further object of the invention is to provide a control for the float valve effective, once the tank is filled, to prevent the float valve from maintaining a constant water level in response to flush valve leakage.

Yet another object of the invention is to provide a relatively simple and economical to manufacture appliance, universally applicable to standard flush tanks, such appliance being adapted to prevent water wastage.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 1 is a top plan view of a flush tank illustrating the application of the control device to the mechanism thereof;

Figure 2 is a sectional view taken on the line 2—2 of Figure 1, showing the essential mechanism within the tank in side elevation;

Figure 3 is an end elevational view of the control device in full tank position as viewed from the plane 3—3 of Figure 1;

Figure 4 is an end elevational view of the control device in empty tank position as viewed from the plane 3—3 of Figure 1;

Figure 5 is a perspective view of the single moving part of the control device; and Figure 6 is a perspective view of the clamp support for the single moving part.

Referring to Figures 1 and 2 of the drawings, there is shown the usual reservoir tank 10 having an inlet or pressure supply pipe 12, the latter having a valve 14, such valve being controlled by a float 16 mounted on an extended arm or rod 18 pivoted as at 20. The arm actuates the valve through a link 22 connecting with a lever 24 acting directly on a valve stem 26. Both the lever 24 and rod 18 are pivotally mounted upon brackets 27 and 28 forming a part of the valve casing. It will be well understood that the rising of the water level in the tank 10 lifts the float 16, driving the valve stem 26 downwardly into valve closing position when the water level has reached the desired height. Such operation is well known and shown, for example, in Kohlmeyer Patent No. 2,290,438.

There is additionally shown the usual overflow pipe 30 secured to the bottom 32 of the tank, the overflow pipe being open as at 34 at the top and being permanently connected to the outlet 36 leading from the bottom of the tank. The overflow pipe 30 is offset from a valve seat 38, also connecting with the outlet 36, which valve seat is closed by a spherical faced rubber valve ball 40. The ball 40 is provided with a stem 42 slidably mounted for vertical movement in the overflow pipe-supported bracket 44. In the usual form of the apparatus, the valve 40, when flushing is desired, is lifted manually by the upward movement of a lever 46, which lever is provided with a depending link 48 having a loop overrunning connection 50 slidably arranged upon the stem 42. Such loop engages a bent end 52 when the link 48 is lifted sufficiently to open the flush valve 40. The lever 46 is pivoted at 47 on a bracket 49, and is actuated by any suitable handle mechanism such as 54 pivotally mounted in the sleeve 56 extending through the front tank wall 58, such mechanism being connected to the lever 46 through linkage 53. The ball valve 40 is hollow, and once lifted from its seat, tends to float upwardly until stopped by the lower arm 60 of the bracket 44, the ball returning to its seat as the water level lowers and the tank becomes empty. The weight of the ball is such as to maintain its seat during the subsequent filling operation.

Should the ball valve 40 be defective or become worn and form an improper seat, allowing continual leakage, the level in the tank will be lowered, lowering the float 16, which in turn opens the valve 14, allowing sufficient water to flow into the tank to make up the loss through leakage. With a defective ball valve 40, such leakage can continue twenty-four hours a day, year in and year out, and consume considerable quantities of water.

It will be appreciated that as the tank is filled after each flush, the float 16 rises with the level of the water within the tank and as the level increases, the valve stem 26 is forced closer and closer to a valve-closed position, thus gradually reducing the rate of flow into the tank until the point is reached when the float completely closes such valve and flow is stopped. If for any reason the link 22 or the lever 24 or the float rod 18 do not pivot freely, it is possible for the linkage to stick, leaving the valve 14 slightly opened, even though the water level rises above the normal operating level on the float 16 and thereby exerts additional valve closing force. Under such circumstances, the level of the water within the tank rises above the open end 34 of the pipe 30, and again continual flow of water in a wasteful manner will result.

In order to make certain that the valve 14 closes when the water level reaches that desired, or to overcome any sticking tendency of the valve linkage which would prevent the inlet valve from ultimately closing, there is provided a multiple bell crank lever 62, such lever being shown in detail in Figures 3–5. The lever is mounted for pivotal movement, and has arms interengaging the manual flushing lever 46 and the float rod 18. As shown in Figure 3, the lever is pivoted as at 64 upon a clamp member 66 having an arm extension 68. The clamp member is adapted to be clamped around the overflow pipe 30 at a suitable height. The lever 62 is freely pivoted as at 64 upon a screw or other fastening extending through the aperture 70 of the bracket 68 and the aperture 72 of the lever 62. The lever 62 is provided with spaced arms 74 and 76, a weight-supporting arm 78 provided with a weight of lead or other heavy material 80, and a curved arm 82. The spaced arms 74 and 76 and weight-supporting arm 78 of lever 62 provide pivotal means supported in the tank, and are so arranged and constructed as to lock the float lever in its uppermost position, which is the valve closed position. At the same time, the arm 82 cooperates with the manual lever 46 to provide a means for actuating the pivoted lever 62 for the purpose of unlocking and releasing the float lever, when the flush valve is opened. The lever 62 is also provided with stop fingers 84 and 86 adapted to engage the lower surface 88 or the upper surface 90, respectively, of the bracket extension arm 68 to provide positive end stops to limit the angle through which the lever 62 may turn.

In Figure 3, the lever 62 is shown in tank-full position with the arm 82 overhanging the manual flush lever 46 and with the arm 76 bearing against the under side of the float ball supporting rod 18. In the position shown, the weight 80 is overcenter and the clamp 66 is positioned at such a height on the pipe 30 that the arm 76 through the effect of the weight 80 has lifted the float ball support arm 18 about ⅛ inch above the position which it would normally take were the lever 62 not employed.

When the manual flush handle 54 is manipulated to open the ball valve 40 and commence a flushing action, the lifting of the lever 46 to the position indicated at 46' in Figure 4 kicks the lever 62 counterclockwise, throwing the weight 80 over-center and causing the lever to take the position shown in Figure 4. As the tank commences to empty, the ball float support rod 18 drops from the position indicated at 18' in Figure 4 to the position shown at 18.

By reason of the spacing between the arms 74 and 76, sufficient lost motion is provided whereby the weight may be moved to the vertical position indicated at 80' without the rod 18 preventing such movement. As soon as the valve 40 is opened, the water level rapidly lowers in the tank, the float 16 with its arm 18 likewise lowering, and the lever 62 is permitted to move to the position shown in Figure 4, the float rod 18 eventually dropping to a position as indicated at 18 in Figure 4, and the weight 80 being over-center as indicated. When the tank becomes empty, the ball valve 40 seats, and water again enters the tank from the supply pipe 12 gradually lifting the float 16 and the arm 18. Such arm 18 engages the arm 74, which tends to momentarily retard the further rise of the float 16, but as the level of the water rises, the rod 18 bears with ever-increasing force against the arm 74, eventually swinging the lever 62 clockwise with its weight 80 over dead center. The float 16 being slightly more submerged as a result of the retarding effect of the lever 74 at this point, rises to a less submerged position. When the weight 80 passes clockwise over dead center, the lever 62 is urged to swing to the position shown in Figure 3, lifting the float ball arm 18 about ⅛ inch above the position it would normally take were the float operating freely without the lever 62.

Thus, there is provided at the time when the tank is sufficiently filled, a quick action effect resulting from the additional upward urge of rod 18 on arm 74 and the shift of weight 80, causing arm 76 to engage rod 18, which tends to kick the float 16 and the rod 18 upward a short distance during which the inlet valve 14 is driven to its seat and closed position. The action thus described assures against any sticking of the linkage between the float 16 with the valve stem 26, which might otherwise tend to prevent the valve 14 from closing.

When the lever 62 is in the position shown in Figure 3, it will be observed that the rod 18 lies in the throat 75 of the U formed by the arms 74 and 76, such throat being above the pivot 64 and only slightly to the left thereof. Thus, should the valve 40 be defective and allow the water to gradually drain from the tank 10, the lever 62, with its over-center weight 80 positioned as shown in Figure 3, would retain the float rod 18 in the position shown in Figure 3, and prevent the float from falling with the lowering level of the water in the tank. Thus, when the tank empties under circumstances as described, namely a defective valve 40, no further water is admitted to the tank, the inlet valve 14 remaining closed. If the tank drains completely and at some subsequent time the flush lever is actuated, no flushing will occur by the reason of the absence of water in the tank. However, actuation of the manual flush lever 46 will kick the lever 62 from the position shown in Figure 3 to the position shown in Figure 4, dropping the float rod 18 to thereby permit the filling of the tank. When the tank is then filled, a second flushing operation of the lever 54 will open the flush valve 40, causing the apparatus to operate in the normal manner.

In many instances, the ball valve 40 may be improperly seated in the previous operation, thus causing the loss of water, whereas upon a second flushing operation, the ball valve may seat properly and the tank fill in the normal manner and retain the normal supply of water without wastage. However, if the ball valve 40 consistently fails to seat properly and permits water in the tank to waste away, there will be thus provided a positive indication each time the flushing mechanism is actuated, that repairs are needed. At the same time, the mechanism is such as to prevent the continual outflow of water accompanied by the continual inflow of water to make up for that wasted by a defective outlet valve. In this manner, the lever 62 in cooperating in the manner described with the float rod and lever 46, will effectively prevent the wastage of valuable water, and at the same time, cause the owner or tenant to ascertain that repairs are required. In addition, as pointed out, the over-center operation of the lever 62 in moving from the position shown in Figure 4 to the position shown in Figure 3 at the end of the fill period, effectively provides a fast end closing movement of the inlet valve adapted to certainly overcome any friction or tendency of the parts to stick with the inlet in a slightly open position. The lever 62 will also be seen to effectuate a slightly faster fill of the tank by reason of the fact that so long as the lever 62 remains in the position shown in Figure 4, the ball float rod 18 is maintained slightly depressed, thereby holding the inlet valve in a more widely open position near the closing end of its movement until the substantially instant final closing movement is effectuated by the movement of the lever 62 from the position shown in Figure 4 to the position shown in Figure 3.

Ordinary ball outlet valves may operate satisfactorily for many years. On the other hand, rubber balls on brand-new toilets have proven defective, requiring replacing. A small leak, hardly perceptible, can consume as much as 200 gallons of water every 24 hours. Such a leak continues quietly without giving any visual evidence. Thus, it will be seen that this invention will detect and make a leak known, and at the same time, stop waste until repairs can be made.

While a single embodiment of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. In a water closet, a tank, a fill pipe having a valve extending into said tank, a float and a float control rod for said valve, said rod extending across said tank, an overflow pipe projecting into said tank and located adjacent to a central section of said float control rod, a flush valve for said tank having a member guided for vertical movement and including guide means therefor mounted on said overflow pipe, a flush lever pivotally mounted on said tank and having a lost motion connection with said member, said lever having a portion adjacent said overflow pipe located on a side thereof opposite from said control rod, a transverse lever having a pivotal mount with respect to said overflow pipe, said transverse lever having an arm adapted to overlie said flush lever, and a bifurcated arm adapted to embrace said control rod when said arm is in one end position and adapted to release said control rod for downward movement when in another end position, and a weighted arm integral with said transverse lever projecting upwardly, and adapted to urge said lever toward either end position when moved to one side or the other of the center of the pivotal mount of said lever, said transverse lever being adapted to be turned by upward movement of said flush lever upon flush valve opening movement to move said weighted arm to the other side of said center, and said float rod being adapted upon rising in response to tank filling to restore said lever through engagement with said bifurcated arm to the one position with said weighted arm on the opposite side of said center, said weight when on said opposite side and said bifurcated arm being so constructed and arranged as to retain said float rod in up position irrespective of water level in said tank, until pivotally actuated by said flush lever.

2. In a water closet, a tank, a fill pipe having a valve extending into said tank, a float and a float control rod for said valve, said rod extending across said tank, an overflow pipe projecting into said tank and located adjacent to a central section of said float control rod, a flush valve for said tank having a member guided for vertical movement and including guide means therefor mounted on said overflow pipe, a flush lever pivotally mounted on said tank and having a lost motion connection with said member, said lever having a portion adjacent said overflow pipe located on a side thereof opposite from said control rod, a transverse lever having a pivotal mount with respect to said overflow pipe, said transverse lever having an arm adapted to overlie said flush lever, and a bifurcated arm adapted to embrace said control rod when said arm is in one end position and adapted to release said control rod for downward movement when in another end position, and a weighted arm integral with said transverse lever projecting upwardly, and adapted to urge said lever toward either end position when moved to one side or the other of the center of the pivotal mount of said lever, said transverse lever being adapted to be turned by upward movement of said flush lever upon flush valve opening movement to move said weighted arm to the other side of said center, and said float rod being adapted upon rising in response to tank filling to restore said lever through engagement with said bifurcated arm to the one position with said weighted arm on the opposite side of said center, said weight when on said opposite side and said bifurcated arm being so constructed and arranged as to support said float rod independent of water level in said tank.

3. In a water closet, a tank, a fill pipe having a valve extending into said tank, a float and a float control rod for said valve, said rod extending across said tank, an overflow pipe projecting into said tank and located adjacent to a central section of said float control rod, a flush valve for said tank having a member guided for vertical movement and including guide means therefor mounted on said overflow pipe, a flush lever pivotally mounted on said tank and having a lost motion connection with said member, said lever having a portion adjacent said overflow pipe located on a side thereof opposite from said control rod, a transverse lever having a pivotal mount with respect to said overflow pipe, stops for limiting angular movement of said transverse lever between two end positions, said transverse lever having an arm adapted to overlie said flush lever, and a bifurcated arm adapted to embrace said control rod when said arm is in one end position and adapted to release said control rod for downward movement when in the other end position, and a weighted arm integral with said transverse lever projecting upwardly, and adapted to urge said lever toward either end position when moved to one side or the other of the center of the pivotal mount of said lever, said transverse lever being adapted to be turned by upward movement of said flush lever upon flush valve opening movement to move said weighted arm to the other side of said center, and said float rod being adapted upon rising in response to tank filling to restore said lever through engagement with said bifurcated arm to the one position with said weighted arm on the opposite side of said center, said weight when on said opposite side and said bifurcated arm being so constructed and arranged as to retain said float rod in up position irrespective of water level in said tank, until pivotally actuated by said flush lever.

4. In a water closet, a tank, an inlet valve, a flush valve, a float lever for opening and closing said inlet valve, a manual lever entirely independent of said inlet valve for actuating said flush valve, pivotal means supported in the tank independent of said inlet valve and constructed and arranged for directly engaging and locking said float lever in valve closed position upon reaching valve closed position, and means extending into the path of movement of said manual lever for actuating said pivotal means for unlocking said float lever solely in response to movement of said manual lever.

5. In a water closet, a tank, an inlet valve, a float lever for opening and closing said inlet valve in response to float support from rising water level in said tank, a flush valve, manual means entirely independent of said inlet valve for actuating said flush valve, means independent of said inlet valve and adapted to engage said float lever and responsive to movement of said float lever in inlet valve closed position for establishing a support for said float lever in valve closed position independent of water level float support for said float lever, and means directly responsive to movement of said manual means in actuating said flush valve for rendering said float lever support ineffective and restoring water level float support for said lever.

6. In a water closet, a tank, an inlet valve, a float lever for opening and closing said inlet valve in response to float support from rising water level in said tank, a flush valve, manual means independent of said inlet valve for actuating said flush valve, means independent of said inlet valve and adapted to engage said float lever and responsive to movement of said float lever to inlet valve closed position for establishing a support for said float lever in valve closed position independent of water level float support for said float lever, and means responsive to movement of said manual means in actuating said flush valve for rendering said float lever support ineffective and restoring water level float support for said lever, said means comprising a plural arm lever pivotally mounted for limited angular movement with respect to said tank having a pair of spaced arms adapted to receive said float lever, and an arm adapted to be engaged by said manual means.

7. In a water closet, a tank, an inlet valve, a float lever for opening and closing said inlet valve in response to float support from rising water level in said tank, a flush valve, manual means independent of said inlet valve for actuating said flush valve, means independent of said inlet valve and adapted to engage said float lever and responsive to movement of said float lever to inlet valve closed position for establishing a support for said float lever in valve closed position independent of said water level float support for said float lever, and means responsive to movement of said manual means in actuating said flush valve for rendering said float lever support ineffective and restoring water level float support for said lever, said means comprising a plural arm lever pivotally mounted for limited angular movement with respect to said tank having a pair of spaced arms adapted to receive said float lever, and an arm adapted to be engaged by said manual means, and means for urging said plural arm lever toward one or the other end of its limited angular movement.

8. In a water closet, a tank, an inlet valve, a float lever for opening and closing said inlet valve in response to float support from rising water level in said tank, a flush valve, manual means independent of said inlet valve for actuating said flush valve, means independent of said inlet valve and adapted to engage said float lever and responsive to movement of said float lever to inlet valve closed position for establishing a support for said float lever in valve closed position independent of said water level float support for said float lever, and means responsive to movement of said manual means in actuating said flush valve for rendering said float lever support ineffective and restoring water level float support for said lever, said means comprising a plural arm lever pivotally mounted for limited angular movement with respect to said tank having a pair of spaced arms adapted to receive said float lever, and an arm adapted to be engaged by said manual means, and weight means tending to hold said plural arm means in one or the other end position of its limited angular movement.

9. In a water closet, a tank, an inlet valve for filling said tank, a float lever for operating said valve between open and closed position in response to a rise in water level in said tank, means independent of said inlet valve and adapted to engage said float lever and responsive to movement of said float to valve closed position for holding said float in valve closed position irrespective of subsequent variation in tank water level, and manual means operated entirely independent of said inlet valve for emptying said tank, said manual means being adapted to simultaneously release said holding means.

10. In a water closet, a tank, an inlet valve for filling said tank, a float lever for operating said valve between open and closed position in response to water level in said tank, a flush lever entirely independent of said inlet valve, means independent of said inlet valve and adapted to engage said float lever and effective on movement of said float to valve closed position for locking said float in valve closed position irrespective of subsequent variation in water level, and means actuated by said flush lever for unlocking said locking means and releasing said float for movement in response to water level in said tank.

11. In a water closet, a tank, an inlet valve for filling said tank, a float and pivoted float rod for operating said valve between open and closed position in response to rising water level in said tank, a flush lever entirely independent of said inlet valve, means engaged by said rod and actuated by movement of said float and rod to valve closed position adapted to hold said float and rod in valve closed position irrespective of subsequent variation in water level, and means actuated by said flush lever for rendering said actuated means ineffective to hold said float and rod against movement in response to lowering water level in said tank.

12. In a water closet, a tank, an inlet valve for filling said tank, a float and pivoted float rod for operating said valve between open and closed position in response to rising water level in said tank, a flush lever entirely independent of said inlet valve, means engaged by said rod and actuated by movement of said float and rod to valve closed position adapted to hold said float and rod in valve closed position irrespective of subsequent variation in water level, and means actuated by said flush lever for rendering said actuated means ineffective to hold said float and rod against movement in response to lowering water level in said tank, said actuated means comprising a plural arm lever pivotally mounted with respect to said tank and comprising spaced arms adapted to embrace said rod, and an arm adapted to be actuated by said flush lever.

13. A locking device for use in a water closet having a float lever, a flush lever and an overflow pipe located therebetween, comprising a support adapted for mounting upon an overflow pipe, and a plural arm lever having a pivot mount upon said support, said plural arm lever and support having means for limiting the angular movement thereof with respect to said support, said plural arm lever having a pair of spaced arms for receiving a float lever therebetween adapted to move from a position with said arms extending generally downward, to a position extending slightly above a horizontal position, a vertically extending arm having a weight adapted to move from a position on one side of said pivotal mount to a position on the other side, and an arm extending in a direction substantially opposite from said pair of arms, adapted to engage and be lifted by flushing movement of a flush lever.

14. In a water closet, a tank, a fill pipe having a valve extending into said tank, a float and a float control rod for said valve, said rod extending across said tank, an overflow pipe projecting into said tank and located adjacent to a central section of said float control rod, a flush valve for said tank having a member guided for vertical movement and including guide means therefor mounted on said overflow pipe, a flush lever pivotally mounted on said tank and having a lost motion connection with said member, said lever having a portion adjacent said overflow pipe located on a side thereof opposite from said control rod, a transverse lever having a pivotal mount with respect to said overflow pipe, said transverse lever having an arm adapted to extend into the plane of movement of said flush lever, and means for actuating said arm upon movement of said flush lever, and a bifurcated arm adapted to embrace said control rod when said arm is in one end position and adapted to release said control rod for downward movement when in another end position, and a weighted arm integral with said transverse lever projecting upwardly, and adapted to urge said lever toward either end position when moved to one side or the other of the center of the pivotal mount of said lever, said transverse lever being adapted to be turned by upward movement of said flush lever upon flush valve opening movement to move said weighted arm to the other side of said center, and said float rod being adapted upon rising in response to tank filling to restore said lever through engagement with said bifurcated arm to the one position with said weighted arm on the opposite side of said center, said weight when on said opposite side and said bifurcated arm being so constructed and arranged as to retain said float rod in up position irrespective of water level in said tank, until pivotally actuated by said flush lever.

15. In a water closet, a tank, a fill pipe having a valve extending into said tank, a float and a float control rod for said valve, said rod extending across said tank, an overflow pipe projecting into said tank and located adjacent to a central section of said float control rod, a flush valve for said tank having a member guided for vertical movement and including guide means therefor mounted on said overflow pipe, a flush lever pivotally mounted on said tank and having a lost motion connection with said member, said lever having a portion adjacent said overflow pipe located on a side thereof opposite from said control rod, a transverse lever having a pivotal mount with respect to said overflow pipe, said transverse lever having an arm adapted to extend substantially into the plane of movement of said flush lever, means for actuating said arm upon movement of said flush lever, and a bifurcated arm adapted to embrace said control rod when said arm is in one end position and adapted to release said control rod for downward movement when in another end position, and a weighted arm integral with said transverse lever projecting upwardly, and adapted to urge said lever toward either end position when moved to one side or the other of the center of the pivotal mount of said lever, said transverse lever being adapted to be turned by upward movement of said flush lever upon flush valve opening movement to move said weighted arm to the other side of said center, and said float rod being adapted upon rising in response to tank filling to restore said lever through engagement with said bifurcated arm to the one position with said weighted arm on the opposite side of said center, said weight when on said opposite side and said bifurcated arm being so constructed and arranged as to support said float rod independent of water level in said tank.

16. In a water closet, a tank, a fill pipe having a valve extending into said tank, a float and a float control rod for said valve, said rod extending across said tank, an overflow pipe projecting into said tank and located adjacent to a central section of said float control rod, a flush valve for said tank having a member guided for vertical movement and including guide means therefor mounted on said overflow pipe, a flush lever pivotally mounted on said tank and having a lost motion connection with said member, said lever having a portion adjacent said overflow pipe located on a side thereof opposite from said control rod, a transverse lever having a pivotal mount with respect to said overflow pipe, stops for limiting angular movement of said transverse lever between two end positions, said transverse lever having an arm adapted to extend substantially into the plane of movement of said flush lever, means for actuating said arm upon movement of said flush lever, and a bifurcated arm adapted to embrace said control rod when said arm is in one end position and adapted to release said control rod for downward movement when in the other end position, and a weighted arm integral with said transverse lever projecting inwardly, and adapted to urge said lever toward either end position when moved to one side or the other of the center of the pivotal mount of said lever, said transverse lever being adapted to be turned by upward movement of said flush lever upon flush valve opening movement to move said weighted arm to the other side of said center, and said float rod being adapted upon rising in response to tank filling to restore said lever through engagement with said bifurcated arm to the one position with said weighted arm on the opposite side of said center, said weight when on said opposite side and said bifurcated arm being so constructed and arranged as to retain said float rod in up position irrespective of water level in said tank, until pivotally actuated by said flush lever.

References Cited in the file of this patent

UNITED STATES PATENTS

| | | |
|---|---|---|
| 936,396 | Young | Oct. 12, 1909 |
| 1,070,234 | Delany | Aug. 12, 1913 |
| 1,147,024 | Jackson | July 20, 1915 |
| 1,381,710 | Krantz | June 14, 1921 |